(12) United States Patent
Aldaag et al.

(10) Patent No.: US 11,221,294 B2
(45) Date of Patent: Jan. 11, 2022

(54) OPTICAL SAMPLE CHARACTERIZATION

(71) Applicant: Lumus Ltd., Ness Ziona (IL)

(72) Inventors: Chaim Aldaag, Rechovot (IL); Tzofia Lavi, Ness Ziona (IL); Dror Hermoni, Kibbutz USHA (IL); Jonathan Gelberg, Modiin (IL); Yosef Lavian, Bet El (IL); Netanel Goldstein, Ness Ziona (IL); Elad Sharlin, Mishmar David (IL); Elad Lavi, Ness Ziona (IL); Kobi Greenstein, Ness Ziona (IL); Amir Shapira, Ness Ziona (IL); Mordechai Gilo, Ness Ziona (IL); Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/043,842

(22) PCT Filed: Apr. 7, 2019

(86) PCT No.: PCT/IB2019/052852
§ 371 (c)(1),
(2) Date: Sep. 30, 2020

(87) PCT Pub. No.: WO2019/197959
PCT Pub. Date: Oct. 17, 2019

(65) Prior Publication Data
US 2021/0055218 A1 Feb. 25, 2021

Related U.S. Application Data

(60) Provisional application No. 62/654,460, filed on Apr. 8, 2018.

(51) Int. Cl.
G01N 21/59 (2006.01)
G01N 21/84 (2006.01)
G02B 27/30 (2006.01)

(52) U.S. Cl.
CPC ......... G01N 21/59 (2013.01); G01N 21/8422 (2013.01); *G01N 2021/8427* (2013.01); *G02B 27/30* (2013.01)

(58) Field of Classification Search
CPC .............. G01M 11/0221; G01M 11/02; G01N 2021/8433; G01N 21/8422; G01N 21/59
See application file for complete search history.

(56) References Cited

U.S. PATENT DOCUMENTS

| | | | | |
|---|---|---|---|---|
| 5,221,961 A | * | 6/1993 | Shen | G01N 21/59 356/432 |
| 2006/0209304 A1 | * | 9/2006 | Simpson | G01N 21/59 356/443 |

(Continued)

*Primary Examiner* — Maurice C Smith
(74) *Attorney, Agent, or Firm* — Mark M. Friedman

(57) ABSTRACT

Optical sample characterization facilitates measurement and testing such as transmittance or reflectance at any discrete angle in a full range of angles of light propagation through a coated glass plate having a higher than air index of refraction. A rotatable assembly includes a cylinder having a hollow, and a receptacle including the hollow. The receptacle also contains a fluid having a refractive index matching the refractive index of the cylinder and coated plate. An optical light beam is input normal to the surface of the cylinder, travels through the cylinder, then via the index matching fluid through the coating, the coated glass plate, the fluid, the other side of the cylinder, and is collected for analysis. Due at least in part to the index matching fluid surrounding the coated plate, the plate can be rotated through a full range of angles (±90°, etc.) for full range testing of the coating.

20 Claims, 7 Drawing Sheets

(56) References Cited

U.S. PATENT DOCUMENTS

| | | | |
|---|---|---|---|
| 2006/0279725 A1* | 12/2006 | Coville | G01N 21/59 356/39 |
| 2008/0192239 A1* | 8/2008 | Otosaka | G01B 11/08 356/73.1 |
| 2014/0233015 A1* | 8/2014 | Mander | G01N 21/0303 356/51 |
| 2016/0209329 A1* | 7/2016 | Mueller | G01N 33/49 |

* cited by examiner

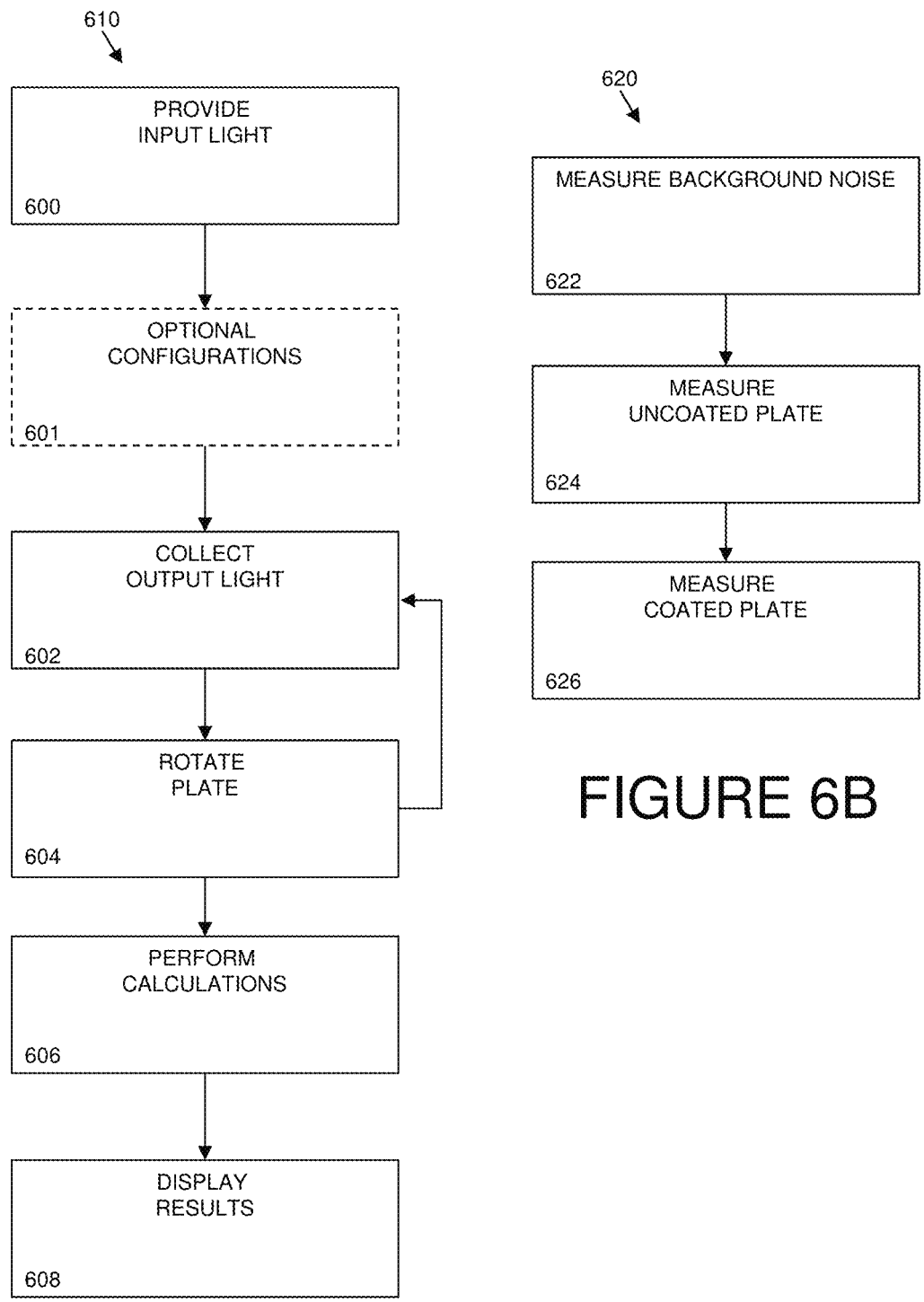

OPTICAL SAMPLE CHARACTERIZATION

FIELD OF THE INVENTION

The present invention generally relates to optical testing, and in particular, it concerns full range testing of coatings.

BACKGROUND OF THE INVENTION

Current techniques for measuring optics, in particular coatings, are limited to a small range of angles, or a small set of discrete angles, and/or have significant problems due to refraction. Generally, there is a lack of consistency and/or accuracy in the results of measuring.

SUMMARY

According to the teachings of the present embodiment there is provided an apparatus for optical testing of a sample of optical material, the apparatus including: a rotatable assembly including: a general-cylinder having a central hollow on an axis of the general-cylinder, the hollow sized to receive at least a core area of the sample of optical material, a turntable aligned with the axis and operable to rotate the rotatable assembly around a height-axis of the general-cylinder, and a receptacle including the hollow, the receptacle sized to receive at least a portion of the sample of optical material, and the receptacle sealed for receiving a quantity of index matching fluid, such that the fluid surrounds and is in contact with at least the core area, and is in contact with the general-cylinder, and an optical arrangement: aligned with the axis, including an optical source providing an optical light beam normal to a surface area at a first side of the general-cylinder, and including an optical detector accepting the optical light beam normal to a surface area at a second side of the general-cylinder.

In an optional embodiment, further including: a mounting arrangement for receiving the optical arrangement and adjustable for aligning the optical source and the optical detector. In another optional embodiment, further including a clamping mechanism securing location of the sample with respect to the receptacle. In another optional embodiment, further including a motor operationally connected to the rotatable assembly and operable to rotate the rotatable assembly, and an encoder operationally connected to the rotatable assembly and operable to provide position information at least regarding angle of rotation of the rotatable assembly.

In another optional embodiment, the general-cylinder is selected from the group consisting of: a cylinder, and a prism.

In another optional embodiment, indexes of refraction of the general-cylinder, the sample, and the fluid are substantially equal. In another optional embodiment, the general-cylinder and the sample of an optical material are made of the same optically transparent, solid material. In another optional embodiment, the general-cylinder is substantially symmetric parallel to the height-axis of the general-cylinder.

In another optional embodiment, the general-cylinder is positioned according to the group consisting of: stationary, rotatable in a single axis, rotatable in more than one axis, rotatable in a pre-defined range of angles, and rotatable ±90 degrees from a normal to the sample. In another optional embodiment, the core area of the sample is a location of the sample where a light beam encounters the sample and testing of the sample is performed.

In another optional embodiment, the receptacle has: a receptacle-width in a direction along a cylinder diameter of the general-cylinder, the receptacle-width being smaller than the cylinder diameter, and a receptacle-thickness non-parallel to the receptacle-width, the receptacle-thickness between a first side and second side of the general-cylinder, and the sample has: a plate-width in a direction along the cylinder diameter, the receptacle-width being greater than the plate-width, and a plate-thickness non-parallel to the plate-width, the receptacle-thickness being greater than the plate-thickness.

In another optional embodiment, the receptacle-width and the plate-width are aligned substantially parallel. In another optional embodiment, the receptacle is configured to contain 0.5 cubic centimeters (cc) to 50 cc of fluid.

In another optional embodiment, the sample is selected from the group consisting of: a glass plate, a coated glass plate, a thin film polarizer, a plastic polarizer, and a quarter wave filter. In another optional embodiment, the optical element is coated with a coating, the coating used to manipulate light incident to the sample.

In an optional embodiment, the majority is selected from the group consisting of: 51%, 80%, 90%, 95%, and 98%.

In another optional embodiment, the optical arrangement includes: collimating optics preparing the optical light beam and inputting the optical light beam into the general-cylinder, the collimating optics adjustable with at least two degrees of freedom. In another optional embodiment, an optical path of the optical light beam is through the general-cylinder and the fluid, and a majority of the optical path is through the general-cylinder.

According to the teachings of the present embodiment there is provided a controller operationally connected to the apparatus of claim 1, the controller configured to: initiate inputting an optical light beam normal to a surface area of a first side of the general-cylinder; position the general-cylinder so a light beam path traverses via a first side of the general-cylinder until reaching the hollow, then traverses from the first side into the fluid in the hollow on a first side of the sample, through the sample, through the fluid on an other side of the sample, into a second side of the general-cylinder, traverses the second side and exits normal to a surface area of the second side of the general-cylinder as an output signal; and activate capturing the output signal by the optical detector.

In an optional embodiment, the controller is further configured to: after positioning the general-cylinder at a first angle of the sample relative to the light beam path, rotate the general-cylinder such that the sample is at a second angle relative to the light beam path, and repeat the capturing and the rotating.

According to the teachings of the present embodiment there is provided a method for optical testing of a sample of optical material, the method including the steps of: providing the apparatus for optical testing of a sample of optical material, inputting an optical light beam normal to a surface area of a first side of the general-cylinder; positioning the general-cylinder so a light beam path traverses via a first side of the general-cylinder until reaching the hollow, then traverses from the first side into the fluid in the hollow on a first side of the sample, through the sample, through the fluid on an other side of the sample, into a second side of the general-cylinder, traverses the second side and exits normal to a surface area of the second side of the general-cylinder as an output signal; and capturing the output signal by the optical detector.

In an optional embodiment, further including the steps of: after the positioning at a first angle of the sample relative to the light beam path, rotating the general-cylinder such that the sample is at a second angle relative to the light beam path, and repeating the capturing and the rotating.

In another optional embodiment, further including the step of: processing data collected by the capturing to calculate results of the optical testing. In another optional embodiment, further including the step of: prior to inputting the optical light beam to traverse the sample, measuring background noise by inputting the optical light beam to the general-cylinder without the sample.

In another optional embodiment, further including the step of: subsequent to the measuring background noise and prior to inputting the optical light beam to traverse the sample, measuring an uncoated plate by using an uncoated sample having a same index of refraction as an index of refraction of the sample, wherein the sample is coated.

According to the teachings of the present embodiment there is provided a non-transitory computer-readable storage medium having embedded thereon computer-readable code for optical testing of a sample of optical material, the computer-readable code including program code for initiating inputting an optical light beam normal to a surface area of a first side of the general-cylinder; positioning the general-cylinder so a light beam path traverses via a first side of the general-cylinder until reaching the hollow, then traverses from the first side into the fluid in the hollow on a first side of the sample, through the sample, through the fluid on an other side of the sample, into a second side of the general-cylinder, traverses the second side and exits normal to a surface area of the second side of the general-cylinder as an output signal; and activating capturing the output signal by the optical detector.

BRIEF DESCRIPTION OF FIGURES

The embodiment is herein described, by way of example only, with reference to the accompanying drawings, wherein:

FIG. 6A is a flowchart of a method for optical sample characterization.

FIG. 6B is a flowchart of a testing sequence using the testing method for optical sample characterization.

DETAILED DESCRIPTION—APPARATUS—FIGS. 1A TO 4

Figure 1A:
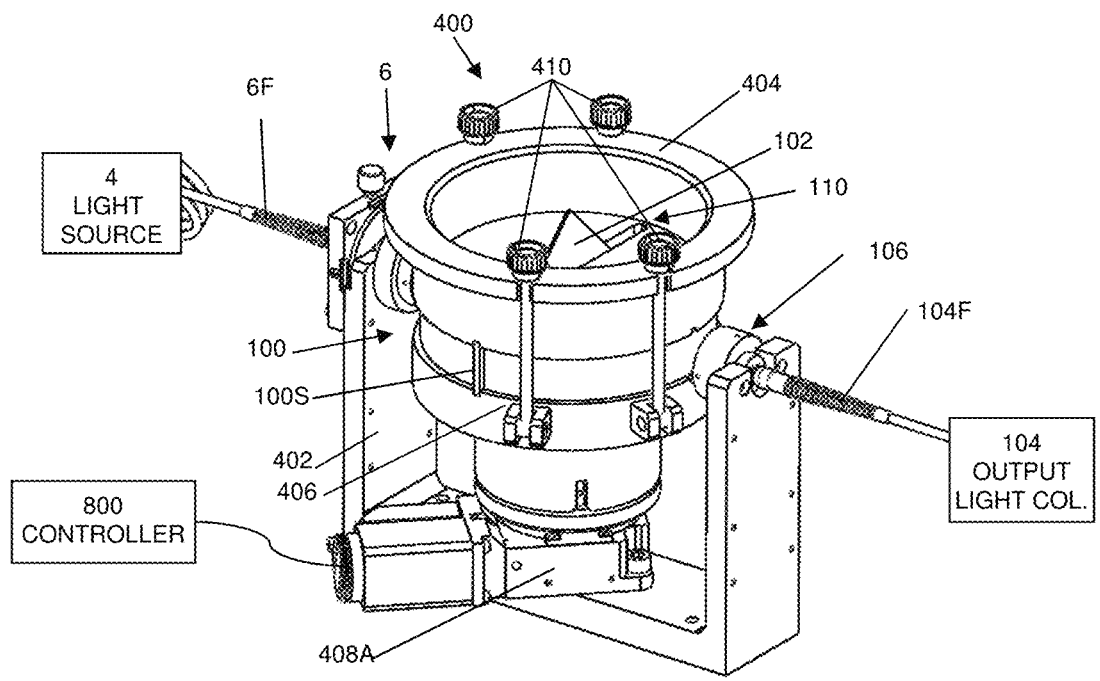
FIG. 1A is a sketch of an apparatus for full-range optical sample characterization (testing).

The principles and operation of the apparatus and method according to a present embodiment may be better understood with reference to the drawings and the accompanying description. A present invention is an apparatus and method for optical sample characterization. The invention facilitates measurement and testing of a full range of angles of light propagation through glass having a higher than air index of refraction.

In general, an innovative rotatable assembly includes a glass cylinder having a hollow. The hollow is a portion of a receptacle in the rotatable assembly. The receptacle is sized for variable-size coated glass plates. The receptacle also contains a fluid having a refractive index matching the refractive index of the glass cylinder. A light beam propagates from a test source via collimating optics, entering normal (90 degrees) to the surface of the cylinder, through the cylinder, then via the index matching fluid through the coating, the (coated) glass plate, the fluid, the other side of the cylinder, and is collected for analysis. Due at least in part to the index matching fluid surrounding the coated plate, the plate can be rotated through a full range of angles (±90°, etc.) for any discrete angle in the full range testing of the coating. Preferably, the cylinder and the plate are made of the same material, thus having matching indexes of refraction. An exemplary typical material is BK7 glass, however, this example is not limiting, and other glasses and other materials besides glass can be tested. This apparatus and method can also be used to measure directly the reflectance of the coated plate.

Current devices and methods are not adequate for characterizing the current and foreseen coatings over a full range of incident angles in glass. Conventional techniques are inadequate for meeting existing requirements. A technique is required to implement maximal, preferably full range angular measurement of coatings. In the context of this document, the term "full range" generally refers to a range of 180°, or ±90°, with respect to normal to the coated plate being tested. The full range may be other than ±90° for specific implementations. In contrast, conventional measurement techniques typically measure a range of discrete angles only in air. For example, 70° transmission in air and 45° reflection in air with optional specialized modules added to standard single or double beam spectrophotometers. For measurement in glass, the conventional method is to assemble the coating in a prism assembly and then measure the performance in a range of up to ±5°. The measurement angle is restricted to the angle of the prisms in the assembly (±5°).

Snell's law, regarding total internal reflection (TIR) and dependency of the path of light travelling through the materials, limits the angle of incidence of the plate being measured. For example, consider a ray of light moving from an example glass to air. The critical angle $\theta_{cr}$ is the value of incident angle in the glass, $\theta_1$, for which the exit angle in air, $\theta_2$, equals 90°, i.e. the refractive indices of example glass $n_1$ and air $n_2$, are respectively approximately 1.52 and 1 giving the value of ~41°, using Snell's law for light traversing from one optical medium to another. Therefore, a measurement in air cannot replicate measurement of angles above ~41° in glass.

For simplicity in this description, the term "coated plate" may also be referred to as a "plate" or "coating", as will be obvious from context. Current typical plate sizes include 70×70 mm (millimeters) and 60×30 mm. In the context of this document, the term "coated plate" generally refers to a plate having an optical coating on a surface of the plate. Coatings are typically multilayer thin films. A coated glass plate is generally used in this description, but is not limiting, and other materials and shapes may be used. In general, the plate can be an arbitrary, non-air, shape which allows free, non-scattering, optical path between the light source and the light detector. The testing apparatus may measure any sample of an optical material (sample, optical element), such as thin film or plastic polarizer, quarter wave filters, and more. Optical filters (coatings) are used to manipulate incident light (incident to the coated plate) to designated reflectance, transmittance, absorption, polarization, etc. To test (probe and measure) the coating and/or compare the actual performance of the coating versus the designated required performance of the coating, optical measurement is used.

Embodiments of the apparatus and method of the current description can be used for characterization, measurement, and testing. The apparatus can be implemented for a variety of functions, including acceptance measurements for coating devices and processes (coating materials such as glass plates). For simplicity in this document, the term "testing" is used, but should not be considered limiting.

Figure 1B:
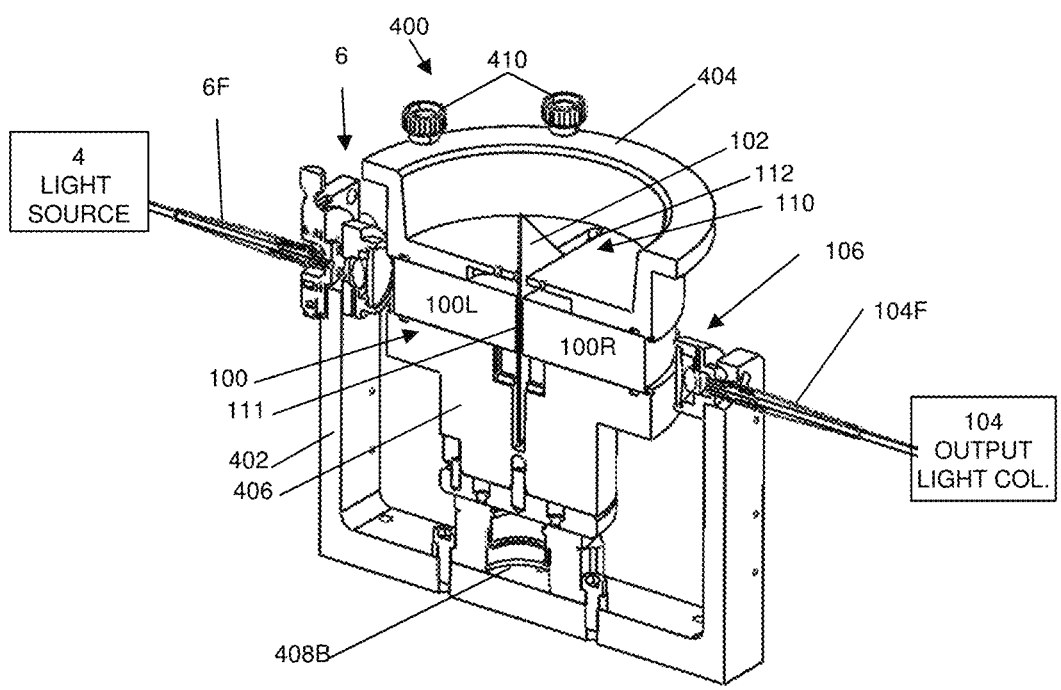
FIG. 1B is a sketch of a sectional view of the apparatus.

Referring now to the drawings FIG. 1A, is a sketch of an apparatus for full-range optical sample characterization (testing) and FIG. 1B is a sketch of a sectional view of the apparatus. The testing apparatus 400 is generally referred to in the context of this document as a "jig". The testing apparatus 400 holds the plate being tested, support structure, and guides the elements, providing repeatability, accuracy, and interchangeability in the testing. The testing apparatus 400 includes a base 402 to which various other elements are mounted. The exemplary optical material being tested is a coated plate 102 seated in a receptacle 110 in a rotatable assembly. The rotatable assembly includes a cylinder 100 and a turntable. The cylinder 100 includes a hollow 111. The turntable can be implemented by the bottom portion 406 having a motor attachment area 408B with a motor 408A connected. The receptacle 110 is filled with a refractive index matching fluid 112. Position pins 410 can be used to clamp the cylinder 100 between a top portion 404 and a bottom portion 406. An exemplary side containment for fluid 112 is shown as rib 100S. A test light source 4 provides an optical input signal via optional input cable 6F to collimating optics 6. The collimating optics 6 prepares the input signal for input into rotatable cylinder 100. Output optics 106 feed an optional output cable 104F to an output light collector (light detector) 104.

For convenience of reference, the rotatable cylinder 100 is referred to in the context of this document as the cylinder 100. The rotatable cylinder 100 is typically a solid material, transparent to an optical light beam. The shape of the cylinder 100 can be, in general, what is known by some authors in the field of mathematics as a "general-cylinder". A general-cylinder is defined as a category of solids which include prisms as a form of cylinder. As the receptacle 110 can be formed within both cylinders and prisms, we use the term "general cylinder" to include embodiments using either a cylinder or prism. For example, the round surface of a cylinder allows any angle of rotation to be used for the cylinder (and hence for measuring the coated plate 102) while maintaining the optical input and output substantially normal to the surface of the cylinder 100. If one were to only need, for example, 5 or 10 discrete measurements, a 10 or 20-sided a polygonal circumference can be used and the motor confined to step by 18 or 9 degrees. Even more generally, the shape of the cylinder 100 can be an arbitrary, non-air, shape which allows free, non-scattering, optical path from the optical light source 4 to the optical detector 104. Based on this description, one skilled in the art will be able to design the other apparatus and system components accordingly.

The cylinder 100 can be stationary, rotate in a single axis, or rotate in one or more axes to move the plate 102 for testing of various incident angles and areas of the plate. The current description and figures are only of the cylinder 100 being rotated around a fixed axis (the height-axis of the cylinder). Based on this description, one skilled in the art will be able to design and implement one of more directions of movement and testing of the plate 102.

For convenience of reference, the input signal is shown entering the cylinder 100 from a left side of the figures and the corresponding labeled first side is a left side of the cylinder 100L. A labeled second side is a right side of the cylinder 100R adjacent to output optics 106 that feed an optional output cable 104F to an output light collector 104. It will be obvious to one skilled in the art that the cylinder 100 is generally substantially symmetric. The cylinder 100 can be rotated horizontally, and the left side 100L and right side 100R of the cylinder can be interchanged. In a non-limiting example, the cylinder 100 can be implemented as a single piece (of glass), with a hollow 111 in the middle for the receptacle 110. In this case, the left side of the cylinder 100L and the right side of the cylinder 100R are opposite sides of the same piece. The hollow 111 may extend the entire height of the cylinder (top to bottom), or be partial, for example, forming a pocket in the cylinder. In another non-limiting example, the cylinder 100 can be created from two pieces, a first piece being the first, left side of the cylinder 100L and a second piece being the second, right side of the cylinder 100R.

The collimating optics 6 and the output optics 106 are preferably adjustable with at least two degrees of freedom to allow adjustment of the light beam, initial, and subsequent calibration. For example, the collimating optics 6 and the output optics 106 may be adjusted ±0.5 mm along the x-axis and y-axis of the light beam path.

For convenience of reference, refractive index matching fluid 112 is referred to in the context of this document as "fluid 112". Preferably, the fluid 112 has a refractive index matching the refraction index of the glass of the cylinder 100. Preferably, the cylinder 100 and the plate 102 are made of the same material (so the respective indices of refraction match). Regarding specific matching of indexes and ranges of difference between element's refractive indexes, one skilled in the art will be aware of the allowable tolerances.

The input cable 6F and the output cable 104F are typically optical fibers, but can be any suitable transmission medium depending on the specifics of the implementation.

The testing apparatus 400 typically includes the top portion 404 and the bottom portion 406 for supporting and mounting various cylinders 100. Position pins 410 can be used to attach the top portion 404 to the bottom portion 406, clamping the cylinder 100 between the top and bottom portions, facilitating alternative cylinders 100, top 404, and bottom 406 portions being used. For example, the top portion 404 can be changed to a second top portion including a different size and/or configuration of receptacle to test a different plate. Or for example, a cylinder composed of a first material having a first index of refraction for testing a plate having a first index of refraction can be replaced with a cylinder composed of a second material having a second index of refraction for testing a plate having a second index of refraction. In another example, the cylinder, top, and bottom portions are all replaced with alternative elements having (creating) a wider/thicker receptacle for testing a thicker plate, or for creating a different shaped receptacle for testing a different shape of optical sample, for example round.

The cylinder 100 can be rotated by a variety of means. In the current figures, exemplary motor attachment area 408B is provided at the bottom of the bottom portion 406, and also shown with a motor 408A connected. The motor 408A, in this case in a typical combination with the bottom portion 406, functions as a general turntable for rotating the cylinder 100 around a height-axis of the cylinder 100. The cylinder 100 and turntable form the rotatable assembly. Rotating the rotatable assembly rotates the cylinder 100, thereby rotating the receptacle 110 and sample (coated plate 102). A controller 800 is operationally connected to the motor 408A in the current figure, and for clarity is not shown in all figures. Not shown in the figures is an encoder operationally connected to the rotatable assembly. The encoder provides position information at least regarding angle of rotation of the rotatable assembly so the position of the coated plate 102 is known with respect to an axis of the cylinder 100 and to angle with regard to a normal to the coated plate 102 (the optical sample being tested). As is known in the art, the position encoder may be part of the motor 408A or a separate component.

For reflectance measurements, the output optics 106 are typically placed at a different angle than shown in the drawings, to collect a beam reflected from the plate 102 under test.

The base 402 provides a mounting arrangement for various jig components, depending on specific testing configurations, such as the motor 408A, motor attachment area 408B, bottom portion 406, and for receiving, adjusting and aligning the optical arrangement (optical test light source 4, input cable 6F, collimating optics 6, output optics 106, output cable 104F, and output light collector 104).

Figure 2:
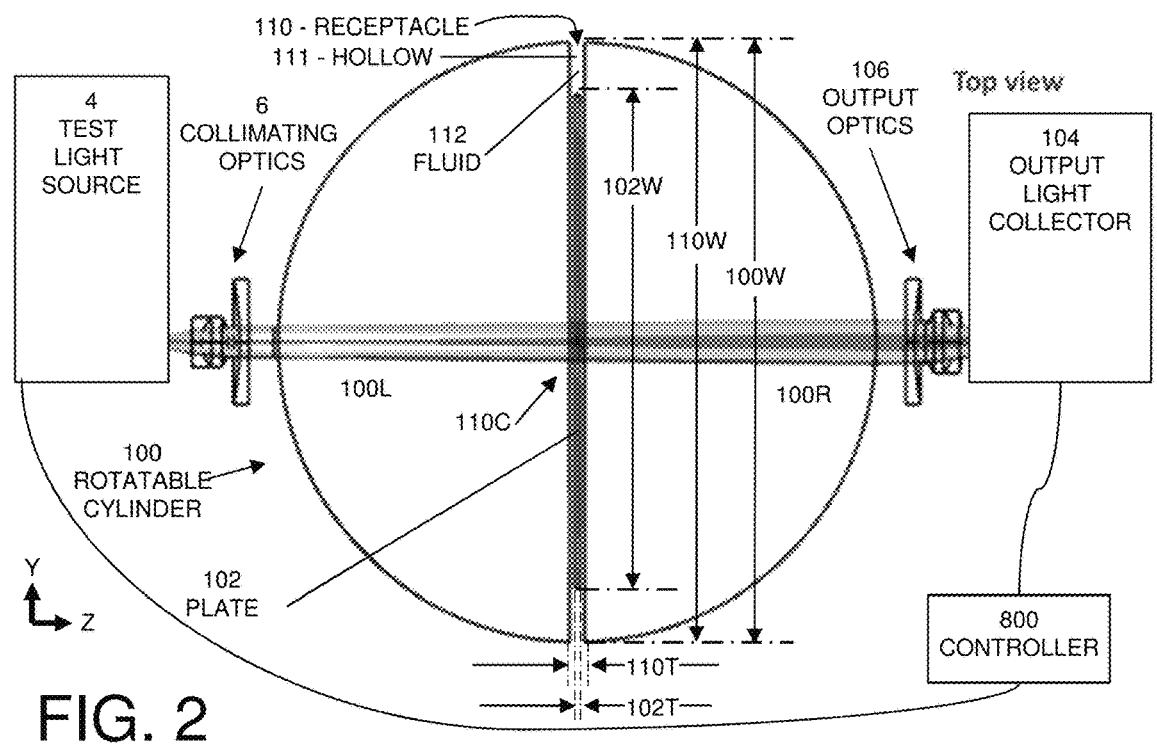
FIG. 2 is a sketch of a top view of the cylinder.

Referring now to the drawings, FIG. 2 is a sketch of a top view of cylinder 100. Optional input cable 6F and optional output cable 104F are not shown in the current figure. The test light source 4 provides an optical input signal to collimating optics 6. Similarly, the output optics 106 feed the output light collector 104. Optionally, optical input signal is input via a polarizer and a 90°±1° rotating apparatus after or before fixed lenses. The coated plate 102 is mounted in the receptacle 110 and surrounded by the fluid 112. In the current top view, side containment for the fluid 112 is not shown. Based on the current description, one skilled in the art will be able to design and implement appropriate containment for the fluid, for example, by using the top portion 404 extended around the cylinder 100. The controller 800 is typically operationally connected at least to the test light source 4 and the output light collector 104.

The plate 102 has a first dimension horizontally (up-down on the page of the current figure, along an axis of the cylinder 100) as plate-width 102W and a second dimension shown as plate-thickness 102T (left-right on the page of the current figure). Similarly, and correspondingly, the receptacle 110 has a first dimension shown as receptacle-width 110W (up-down on the page of the current figure, along an axis of the cylinder 100) and a second dimension shown as receptacle-thickness 110T (left-right on the page of the current figure). The receptacle-width 110W can be slightly smaller than the diameter 100W of the cylinder 100, depending on the size of implementation of side containment for the fluid 112. As noted above, in the current figure the side containment is not shown, and the receptacle width 110W is shown as the same size as the diameter 100W of the cylinder 100. The receptacle-thickness 110T is a distance between the left side of the cylinder 100L and the right side of the cylinder 100R. Alternatively, the receptacle-width 110W can be a different size from the cylinder diameter 100W, for example the receptacle-width 110W being smaller than the cylinder diameter 100W.

Typically, the plate 102 and the receptacle 110 are substantially parallel, that is, the widths of the plate (plate-width 100W) and receptacle (receptacle-width 110W) are aligned. The sides of the receptacle 110 (the edges of the receptacle, distant from the area of the receptacle 110 used to perform the measurement of the plate 102) are typically parallel, but not required to be parallel. Depending on the specific measurement required, a distance between the sides of the receptacle at the edges of the receptacle can be closer or preferably farther apart than a distance between the sides of the receptacle in a core area 110C where the measurement is performed. The core area 110C, also known as the "critical area" is a location where the coating is tested, that is, the location where the light beam encounters the coated plate 102. Typically, the core area 110C is small, and the remaining area of the receptacle 110 can be designed primarily to support the sample test plate 102. A typical core area 110C includes a minimum defined cylinder measuring zone of ±10 mm.

A feature of the current embodiment of the testing apparatus 400 is that the receptacle 110 is small compared to the bath 5100 of the bath-jig 500. An alternative embodiment using a fluid bath is described below in reference to the bath-jig 500 of FIG. 5A. The bath 5100 typically holds 300 cc (cubic centimeters) to 2000 cc of fluid. Conventional baths require minimum of 300 cc of fluid, otherwise the level of the fluid is lower than the light source input and output, and the measurement will be in air (not fluid). Typically, volume of the bath is about 500-600 cc.

In contrast, the receptacle 110 typically holds 0.5 cc to 50 cc of fluid. The receptacle 110 can be adjustable in one or more dimensions to accommodate various sizes of plates 102. Another feature of the current embodiment of the testing apparatus 400 is that the cylinder 100 is rotated (as part of the rotatable assembly, thus, the sample to be tested, coated plate 102, is stationary with respect to the fluid 112 and receptacle 110. In contrast, in the bath-jig 500 the sample (coated plate 102) is rotated within the index matching fluid, that is, within the bath 5100. Due to high viscosity of the fluid 112 the rotation of the plate 102 in the fluid 112 in a bath-jig 500 causes disturbance in the fluid 112 and in turn this affects the measured spectra. This problem is solved at least in part by the user of the cylinder 100.

Figure 3:
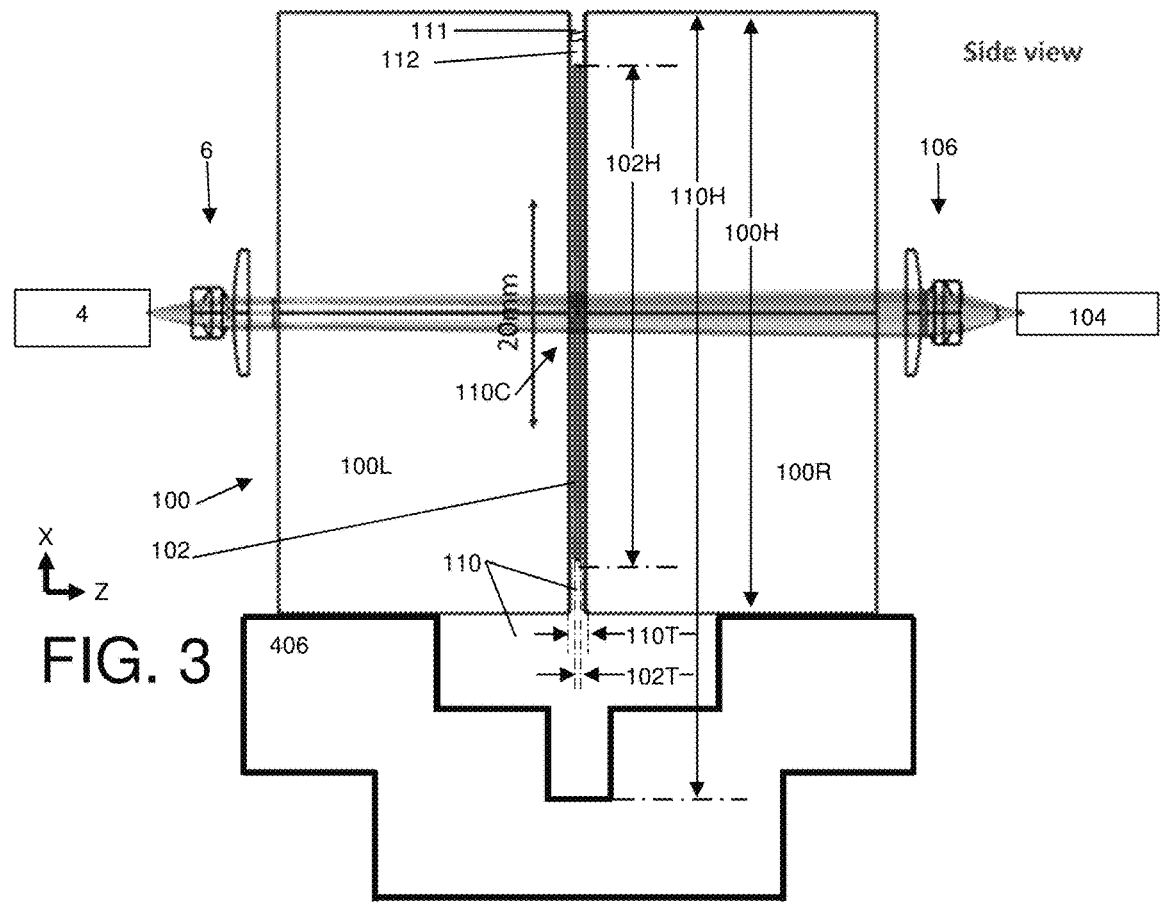
FIG. 3 is a sketch of a side view of the cylinder

Referring now to the drawings, FIG. 3 is a sketch of a sectional side view of the cylinder 100 and bottom portion 406. The plate 102 has a third dimension shown vertically (up-down on the page of the current figure, along a height-axis of the cylinder 100) as plate-height 102H. Similarly, and correspondingly, the receptacle 110 has a third dimension shown as receptacle-height 110H. The receptacle-height 110H can be the same size as cylinder height 100H of the cylinder 100. Alternatively, the receptacle-height 110H can be a different size from the cylinder height 100H. For example, the receptacle-height 110H can be smaller than the cylinder height 100H to account for a fluid containment implementation (sealing) at the bottom of the hollow 111, in the hollow 111 between the left side 100L and the right side 100R of the cylinder. Or for example, the receptacle height 110H can be greater than the cylinder height 100H (as shown in the current figure) and the bottom portion 406 provides sealing at the bottom (below) of the hollow of the receptacle 110.

Figure 4:
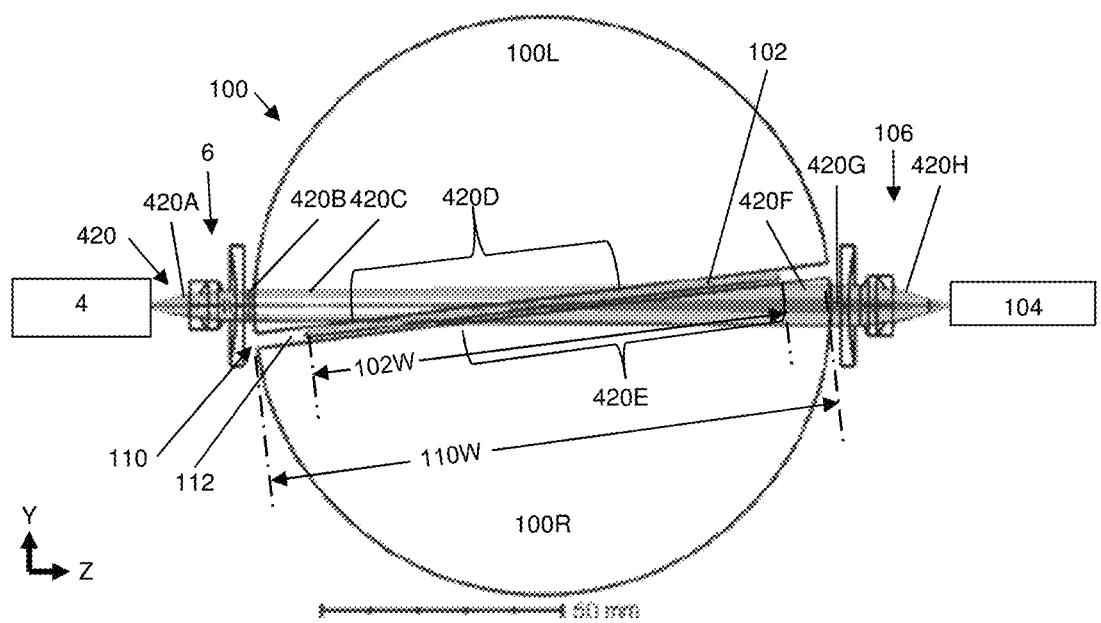
FIG. 4 is a sketch of a top view of the cylinder with the coated plate rotated during testing.

Referring now to the drawings, FIG. 4 is a sketch of a top view of the cylinder 100 with the coated plate 102 rotated during testing. In this non-limiting example, the coated plate 102 has been rotated clockwise almost 90° from the starting position shown in the above figures.

As can be seen in the current figure, a light beam 420, in this case optical light (as a test signal), is provided 420A by the test light source 4 (optional input cable 6F is not shown). The provided 420A light beam is prepared and collimated by the collimating optics 6, and then is input 420B normal to a surface area of the rotatable cylinder 100. The precision of the shape of the cylinder 100 can be determined by the required precision of measurement of the coating on the plate 102. The light beam travels 420C via the left side of the cylinder 100L until reaching the receptacle 110. The light beam traverses (420D-420E) from the left side of the cylinder 100L into the fluid 112 in the receptacle 110, through the coated glass plate 102 (note, the coating on the glass plate is not shown), through the fluid 112 on the other side of the plate 102 and into 420E the right side of the cylinder 100R.

Then the signal traverses 420F the right side of the cylinder 100R and exits 420G normal to the surface of the rotatable cylinder 100. Output optics 106 passes output signal 420H to the output light collector 104 (optional output cable 104F is not shown in the current figures).

As a cylinder only has one circumferential surface, references to inputting the optical light beam and exiting/outputting the optical light beam are to different areas or regions of the surface. Correspondingly, first and second sides of the cylinder are directional references, as can be seen in the figures as shown on the pages.

Figure 5A:
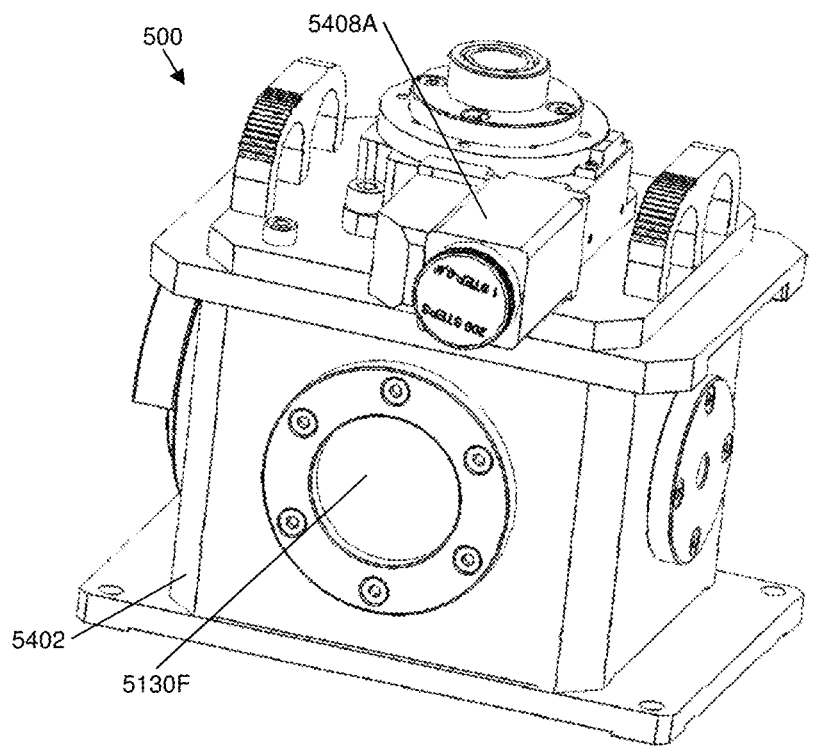
FIG. 5A, is a sketch of a bath-jig apparatus for testing transmittance of an optical sample.
Figure 5B:
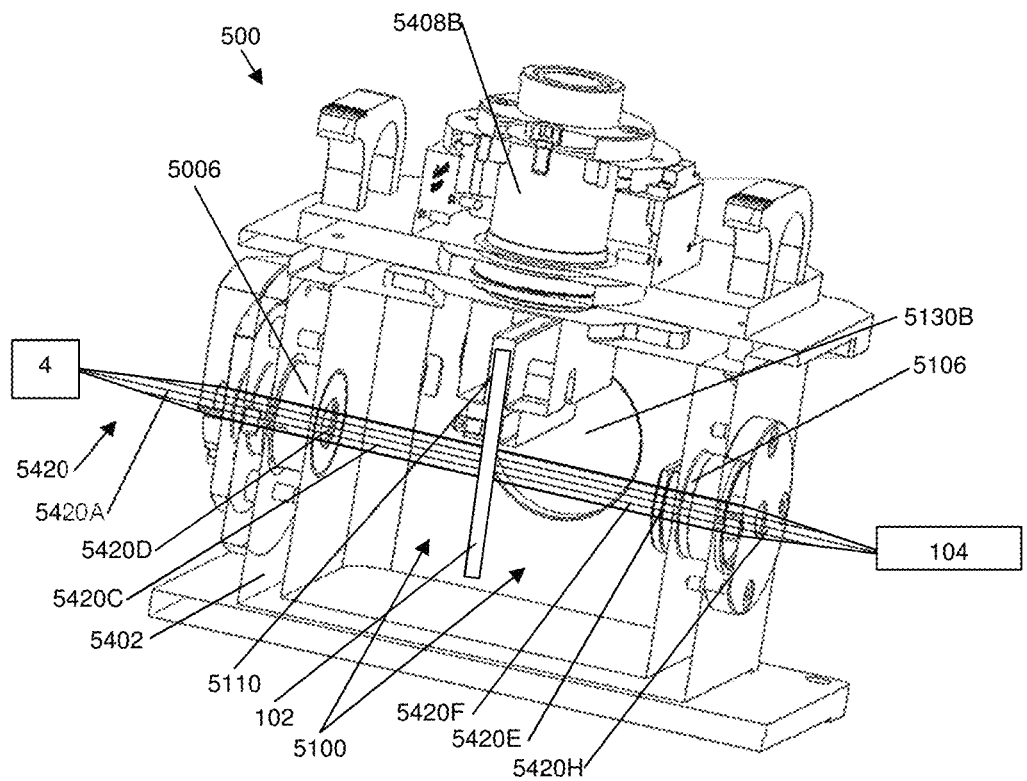
FIG. 5B is a sketch of a sectional view of the bath-jig apparatus.

DETAILED DESCRIPTION—ALTERNATIVE APPARATUS—FIGS. 5A to 5B

Referring now to the drawings FIG. 5A, is a sketch of a bath-jig apparatus for testing transmittance of an optical sample and FIG. 5B is a sketch of a sectional view of the bath-jig apparatus. The testing bath-jig apparatus 500 is generally referred to in the context of this document as a "bath-jig" 500. Similar to the testing apparatus (jig) 400, the bath-jig 500 holds the plate being tested, support structure, and guides the elements. The bath-jig 500 includes a base 5402 to which various other elements are mounted. The coated plate 102 being tested is seated in a plate-mount 5110 in a bath 5100. The bath 5100 is an area of the bath-jig 500 built to contain fluid. The bath 5100 is an internal, hollow space of the bath-jig 500, designed as a fluid containment area. The bath 5100 is filled with a refractive index matching fluid 112 (not shown in the current figures). A test light source 4 provides an optical input signal via optional input cable 6F (not shown) to collimating optics 5006. The collimating optics 5006 (prepare and focus) collimates the input signal into the bath 5100.

The plate-mount 5110 can be rotated by a variety of means. In the current figures, exemplary motor attachment area 5408B is provided at the top of the bath-jig 500, and also shown with a motor 5408A connected.

As can be seen in the FIG. 5B, a light beam 5420, in this case optical light, is provided 5420A by the test light source 4. The provided 5420A light beam is prepared and expanded by the collimating optics 5006 and traverses into the fluid 112 in the bath 5100. The light beam then travels 5420C through the fluid 112 in the bath 5100, through the coated glass plate 102 (note, the coating on the glass plate is not shown), through 5420F the fluid 112 on the other side (of the plate 102). As the bath 5100 is filled with the index matching fluid 112, this traversal of the light beam through the bath-jig 500 is substantially without refraction. Then the signal exits 5420E from the fluid 112 to output optics 5106 that feed 5420H the output signal to the output light collector 104.

The bath-jig 500 is shown with an optional front window 5130F and back window 5130B that allow the internal bath 5100, plate-mount 5110, coated plate 102, and other components to be viewed.

Both the testing apparatus (jig) 400 and the bath-jig 500 can include optional, additional, and alternative configurations. In one alternative, the jigs can be adapted to include vacuum, such as a vacuum bell, to extract dissolved air from the fluid 112. In another alternative, mechanical and/or other enhancements can be used to handle and prevent wobbling in the jigs. Hard fixation (rigid routing) can be used to the optical fibers. The receptacle 110 and plate-mount 5110 can be adjustable to accommodate variable size plates 102. As described above regarding the position pins 410, the jigs, top 404 and bottom 406 portions can be detachable (removably attached) to facilitate replacement with a different refractive index cylinder and ease of operation (for example, sample placement and cleanup).

Additional alternatives for the jigs can include a dark (light opaque) box to cover the entire jig, a dynamic receptacle for the test plate to avoid scratching the plate 102, rotating stages including engine and drivers, an inner clean option, air bubbles extraction (a stagnation area), and sample plate squeezers.

DETAILED DESCRIPTION—METHOD—FIG. 6A TO FIG. 7B

Referring now to FIG. 6A is a flowchart of a method for optical sample characterization. The current method can be used with both the testing apparatus (jig) 400 and the bath-jig 500, as described below in a testing sequence. A method of testing 610 for optical sample characterization starts in step 600, the light beam 420 is provided normal to the cylinder 100. The light beam is typically an optical light beam, referred to as the "input light", or simply as "light", as will be clear to one skilled in the art from the context of this description. Providing the light at a constant normal to the cylinder 100 facilitates the majority of the light coupling into the cylinder 100, so that no light, or minimal light is lost when entering the cylinder. Exemplary coatings include filters that transmit a part of the visible spectrum and reflect another part, a polarizing filter that transmit one polarization state and reflects another polarization state, or an absorbing coating that absorbs part of the visible light.

In step 601, optional configurations are used, as described below.

In step 602, the output light is collected after traversing the cylinder 100, the receptacle 110, and the plate 102, as described above. The output light can be collected, for example, with a spectrometer.

In step 604, the plate 102 is rotated. To what degree the plate is rotated depends on the specific requirements of the test being performed and the measurements desired. Exemplary rotations include 0.5° and 1°. After rotating the plate, output light can again be collected (step 602) at the new, known angle. This cycle of rotating and collecting can be repeated as necessary to gather data on the desired range of angles to be tested (step 604 returns to step 602).

In step 606, optional calculations (processing, signal processing) can be performed on the collected signals. One exemplary calculation is the transmittance of the coating, which can be calculated using the following formula:

$T=(Is-Id)/(Ir-Id)$

Where:
"T" is the transmittance of the coating
"Is" is the optical power of the light signal that is measured
"Id" is the 'dark' measurement of optical power obtained without any input light, and
"Ir" is the optical power measurement of the uncoated glass plate In step 608, optionally the results of the collection and processing can be displayed.

Referring now to FIG. 6B is a flowchart of a testing sequence 620 using the above-described testing method for optical sample characterization 610. A typical sequence of testing 620 begins by measuring the background noise 622, also referred to as measuring the dark noise. Step 622 uses the testing method 610 and in the optional configurations step 601 a polarizer is used by selecting the polarizing position for the following sequence of measurements.

Next, measurements of an uncoated plate 624 are performed. Step 624 uses the testing method 610 in which the plate 102 is an uncoated plate (not coated with a coating). The uncoated plate should have the same index of refraction as the coated plate 102 to be tested, typically the uncoated and coated plates being made from the same material. The uncoated plate is tested at all required angles, that is, through the full range of angles required by the coated plate 102.

In step 626, after characterizing the uncoated plate, measurements of a coated plate 102 are performed. The coated plate 102 is normally tested through the full range of angles that was used for testing the uncoated plate.

Figure 7A:
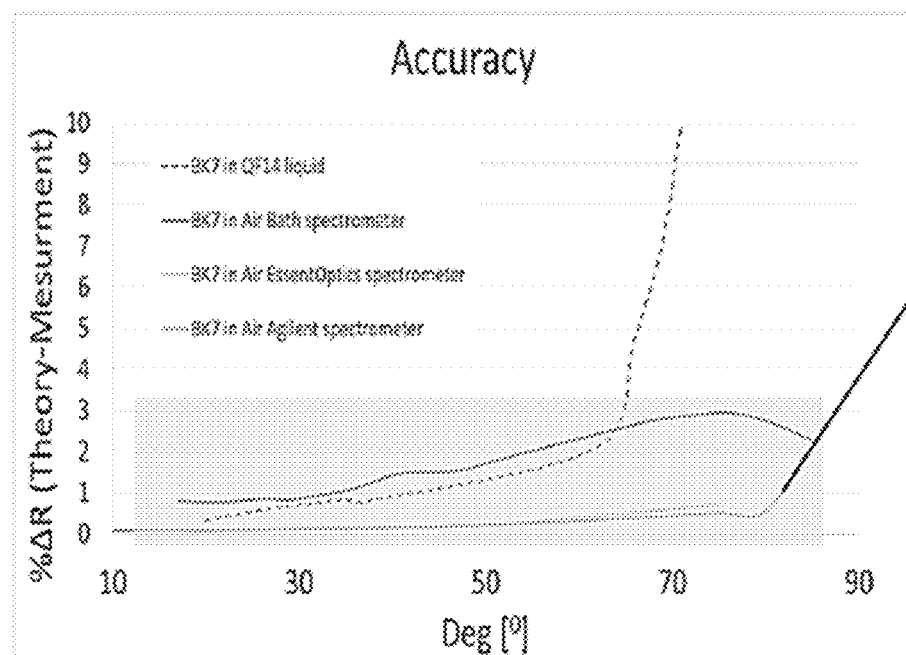
FIG. 7A is a plot of transmittance (y-axis) vs. angle (x-axis).
Figure 7B:
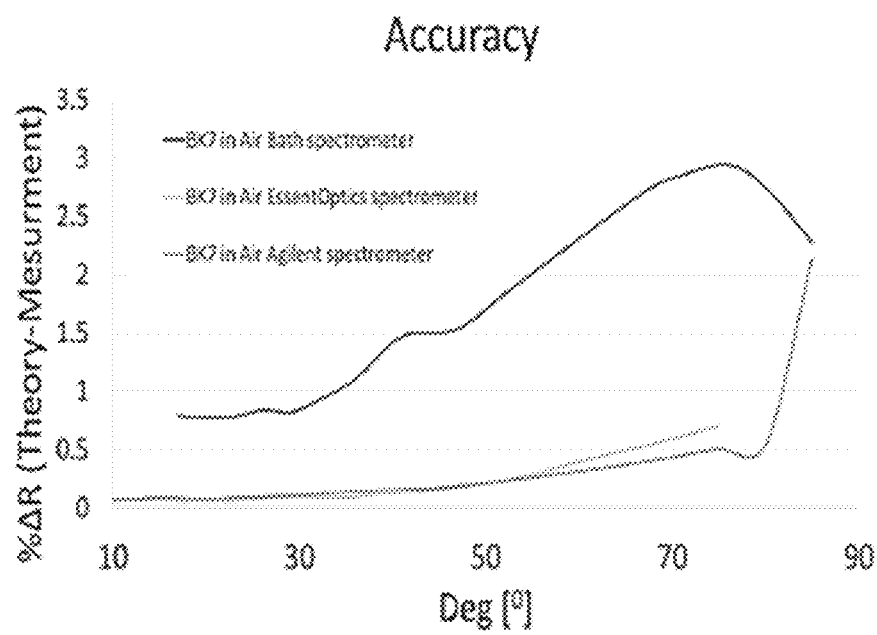
FIG. 7B is a close-up (zoom in) of the transmittance plot of FIG. 7A.

Referring now to FIG. 7A, shown is a plot of transmittance (y-axis) vs. angle (x-axis), and FIG. 7B, showing a close-up (zoom in) of the transmittance plot of FIG. 7A. In general, a successful coating is shown by the plot being horizontally oriented, indicating that over a range of angles the coating had consistent transmittance. The transmittance (amount of light provided minus the amount of light collected) can be of the s or p polarization.

DETAILED DESCRIPTION—CONTROLLER—FIG. 8

Figure 8:
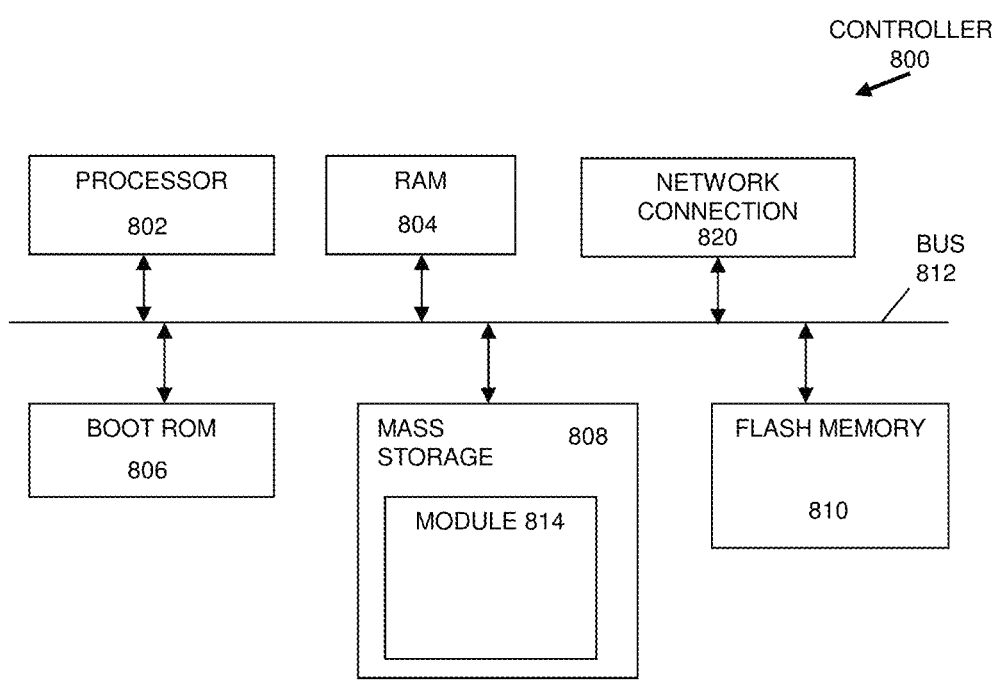
FIG. 8 is a high-level partial block diagram of an exemplary controller

FIG. 8 is a high-level partial block diagram of an exemplary controller 800 configured to implement the method for optical sample characterization 610 of the present invention. Controller (processing system) 800 includes a processor 802 (one or more) and four exemplary memory devices: a random-access memory (RAM) 804, a boot read only memory (ROM) 806, a mass storage device (hard disk) 808, and a flash memory 810, all communicating via a common bus 812. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 802 including but not limited to reduced instruction set computer (RISC) architecture and/or complex instruction set computer (CISC) architecture. A module (processing module) 814 is shown on mass storage 808, but as will be obvious to one skilled in the art, could be located on any of the memory devices.

Mass storage device 808 is a non-limiting example of a non-transitory computer-readable storage medium bearing computer-readable code for implementing the testing methodology described herein. Other examples of such computer-readable storage media include read-only memories such as CDs bearing such code.

Controller 800 may have an operating system stored on the memory devices, the ROM may include boot code for the system, and the processor may be configured for executing the boot code to load the operating system to RAM 804, executing the operating system to copy computer-readable code to RAM 804 and execute the code.

Network connection 820 provides communications to and from controller 800. Typically, a single network connection provides one or more links, including virtual connections, to other devices on local and/or remote networks. Alternatively, controller 800 can include more than one network connection (not shown), each network connection providing one or more links to other devices and/or networks.

Controller 800 can be implemented as a server or client respectively connected through a network to a client or server.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus for optical testing of a sample of optical material, the apparatus comprising:
   (a) a rotatable assembly comprising:
      (i) a general-cylinder having a central hollow on an axis of said general-cylinder, said hollow sized to receive at least a core area of the sample of optical material,
      (ii) a turntable aligned with said axis and operable to rotate said rotatable assembly around a height-axis of said general-cylinder, and
      (iii) a receptacle including said hollow, said receptacle sized to receive at least a portion of the sample of optical material, and said receptacle sealed for receiving a quantity of index matching fluid, such that said fluid surrounds and is in contact with at least said core area, and is in contact with said general-cylinder, and
   (b) an optical arrangement:
      (i) aligned with said axis,
      (ii) including an optical source providing an optical light beam normal to a surface area at a first side of said general-cylinder, and
      (iii) including an optical detector accepting said optical light beam normal to a surface area at a second side of said general-cylinder.

2. The apparatus of claim 1 further comprising:
   a mounting arrangement for receiving said optical arrangement and adjustable for aligning said optical source and said optical detector.

3. The apparatus of claim 1 further comprising a clamping mechanism securing location of the sample with respect to said receptacle.

4. The apparatus of claim 1 further comprising
a motor operationally connected to said rotatable assembly and operable to rotate said rotatable assembly, and
an encoder operationally connected to said rotatable assembly and operable to provide position information at least regarding angle of rotation of said rotatable assembly.

5. The apparatus of claim 1 wherein said general-cylinder is selected from the group consisting of: a cylinder, and a prism.

6. The apparatus of claim 1 wherein indexes of refraction of said general-cylinder, the sample, and said fluid are substantially equal.

7. The apparatus of claim 1 wherein said general-cylinder and the sample of an optical material are made of the same optically transparent, solid material.

8. The apparatus of claim 1 wherein said general-cylinder is substantially symmetric parallel to said height-axis of said general-cylinder.

9. The apparatus of claim 1 wherein said general-cylinder is positioned according to the group consisting of:
(a) stationary,
(b) rotatable in a single axis,
(c) rotatable in more than one axis,
(d) rotatable in a pre-defined range of angles, and
(e) rotatable ±90 degrees from a normal to the sample.

10. The apparatus of claim 1 wherein said core area of the sample is a location of the sample where a light beam encounters the sample and testing of the sample is performed.

11. The apparatus of claim 1 wherein:
(a) said receptacle has:
(i) a receptacle-width in a direction along a cylinder diameter of said general-cylinder, said receptacle-width being smaller than said cylinder diameter, and
(ii) a receptacle-thickness non-parallel to said receptacle-width, said receptacle-thickness between a first side and second side of said general-cylinder, and
(b) the sample has:
(i) a plate-width in a direction along said cylinder diameter, said receptacle-width being greater than said plate-width, and
(ii) a plate-thickness non-parallel to said plate-width, said receptacle-thickness being greater than said plate-thickness.

12. The apparatus of claim 11 wherein said receptacle-width and said plate-width are aligned substantially parallel.

13. The apparatus of claim 1 wherein said receptacle is configured to contain 0.5 cubic centimeters (cc) to 50 cc of fluid.

14. The apparatus of claim 1 wherein the sample is selected from the group consisting of:
(a) a glass plate,
(b) a coated glass plate,
(c) a thin film polarizer,
(d) a plastic polarizer, and
(e) a quarter wave filter.

15. The apparatus of claim 1 wherein said optical element is coated with a coating, said coating used to manipulate light incident to the sample.

16. The apparatus of claim 1 wherein said optical arrangement includes:
collimating optics preparing said optical light beam and inputting said optical light beam into said general-cylinder, said collimating optics adjustable with at least two degrees of freedom.

17. The apparatus of claim 1 wherein an optical path of said optical light beam is through said general-cylinder and said fluid, and a majority of said optical path is through said general-cylinder.

18. A controller operationally connected to the apparatus of claim 1, said controller configured to:
(a) initiate inputting an optical light beam normal to a surface area of a first side of said general-cylinder;
(b) position said general-cylinder so a light beam path traverses via a first side of said general-cylinder until reaching said hollow, then traverses from said first side into said fluid in said hollow on a first side of the sample, through the sample, through said fluid on an other side of the sample, into a second side of said general-cylinder, traverses the second side and exits normal to a surface area of the second side of the general-cylinder as an output signal; and
(c) activate capturing said output signal by said optical detector.

19. A method for optical testing of a sample of optical material, the method comprising the steps of:
(a) providing the apparatus of claim 1;
(b) inputting an optical light beam normal to a surface area of a first side of said general-cylinder;
(c) positioning said general-cylinder so a light beam path traverses via a first side of said general-cylinder until reaching said hollow, then traverses from said first side into said fluid in said hollow on a first side of the sample, through the sample, through said fluid on an other side of the sample, into a second side of said general-cylinder, traverses the second side and exits normal to a surface area of the second side of the general-cylinder as an output signal; and
(d) capturing said output signal by said optical detector.

20. The method of claim 19 further comprising the steps of:
(a) after said positioning at a first angle of the sample relative to said light beam path,
(b) rotating said general-cylinder such that the sample is at a second angle relative to said light beam path, and
(c) repeating said capturing and said rotating.

* * * * *